United States Patent
Fan et al.

(10) Patent No.: US 9,311,959 B1
(45) Date of Patent: Apr. 12, 2016

(54) READ CHANNEL OPTIMIZATION USING MULTI-DIMENSIONAL SMOOTHING

(71) Applicant: Seagate Technology LLC, Cupertino, CA (US)

(72) Inventors: Hongjian Fan, Shakopee, MN (US); Oai Le, Brooklyn Park, MN (US); Wenzhong Zhu, Apple Valley, MN (US); Richard Cox, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/673,500

(22) Filed: Mar. 30, 2015

(51) Int. Cl.
G11B 20/18 (2006.01)
G05B 13/02 (2006.01)
G11B 7/08 (2006.01)
G11B 7/007 (2006.01)

(52) U.S. Cl.
CPC ............ G11B 20/1833 (2013.01); G05B 13/02 (2013.01); G11B 7/083 (2013.01); G11B 20/18 (2013.01); *G11B 7/00781* (2013.01)

(58) Field of Classification Search
CPC .. G11B 7/083; G11B 7/00781; G11B 7/0065; G11B 5/596; G11B 5/59611; G11B 20/0009; G11B 20/10435; G11B 27/36; G11B 5/09; G11B 20/1833; G11B 20/18; H03M 13/23; H03M 13/253; G05B 13/026; G05B 13/04; G05B 13/048

USPC .......... 360/77.06, 77.08, 45, 39, 31; 375/261; 369/103, 94

See application file for complete search history.

(56) References Cited

U.S. PATENT DOCUMENTS

| | | | |
|---|---|---|---|
| 6,216,148 B1 | 4/2001 | Moran et al. | |
| 6,545,836 B1 * | 4/2003 | Ioannou | G05B 13/026 360/77.06 |
| 7,006,206 B2 | 2/2006 | Jones et al. | |
| 8,310,775 B1 | 11/2012 | Boguslawski et al. | |
| 8,396,174 B2 | 3/2013 | Asjadi | |
| 8,693,120 B2 | 4/2014 | Yang et al. | |
| 2006/0171049 A1 | 8/2006 | Dati et al. | |

* cited by examiner

*Primary Examiner* — Ali Neyzari
(74) *Attorney, Agent, or Firm* — Hall Estill Attorneys at Law

(57) ABSTRACT

Apparatus and method for optimizing read channel parameters in a storage device. In some embodiments, a method includes obtaining raw error rate data for different read channel parameter values in each of a plurality of zones of a memory. The raw error rate data for each of the different reach channel parameter values are filtered to provide a sequence of second order polynomial curves with smoothed data points in each of the zones. A second order regression is applied to the smoothed data points in each of the zones to provide a sequence of regression curves. An optimal read channel parameter value for each of the zones is selected using the sequence of regression curves, and the optimal read channel parameter values are used during subsequent read operations to retrieve data stored in the zones.

20 Claims, 7 Drawing Sheets

RAW DATA TABLE

|  | DAC 1 | DAC 2 | DAC 3 | ... | DAC M |
|---|---|---|---|---|---|
| ZONE 1 | BER_1_1 | BER_1_2 | BER_1_3 | ... | BER_1_M |
| ZONE 2 | BER_2_1 | BER_2_2 | BER_2_3 | ... | BER_2_M |
| ZONE 3 | BER_3_1 | BER_3_2 | BER_3_3 | ... | BER_3_M |
| ZONE 4 | BER_4_1 | BER_4_2 | BER_4_4 | ... | BER_4_M |
| ⋮ | ⋮ | ⋮ | ⋮ | ... | ⋮ |
| ZONE N | BER_N_1 | BER_N_2 | BER_N_4 | ... | BER_N_M |

READ CHANNEL OPTIMIZATION USING MULTI-DIMENSIONAL SMOOTHING

SUMMARY

Various embodiments of the present disclosure are generally directed to the selection of optimal channel parameters for a read channel of a data storage device.

In some embodiments, a method includes obtaining raw error rate data for different read channel parameter values in each of a plurality of zones of a memory. The raw error rate data for each of the different read channel parameter values are filtered to provide a sequence of second order polynomial curves with smoothed data points in each of the zones. A second order regression is applied to the smoothed data points in each of the zones to provide a sequence of regression curves. An optimal read channel parameter value for each of the zones is selected using the sequence of regression curves, and the optimal read channel parameter values are used during subsequent read operations to retrieve data stored in the zones.

In other embodiments, an apparatus includes a memory, a read channel and an analysis engine. The memory includes a plurality of zones. The read channel is adapted to reconstruct data stored in the memory. The analysis engine selects an optimal read channel parameter for use by the read channel during read operations with each of the respective zones. The analysis engine is configured to filter raw error rate data for each of a plurality of settings of the read channel parameter to provide a sequence of second order polynomial curves with smoothed data points in each of the zones, to apply a second order regression to the smoothed data points in each of the zones to provide a sequence of regression curves, and to select the optimal read channel parameter for each of the zones using a minimum point in each of the sequence of regression curves.

DETAILED DESCRIPTION

Figure 1:
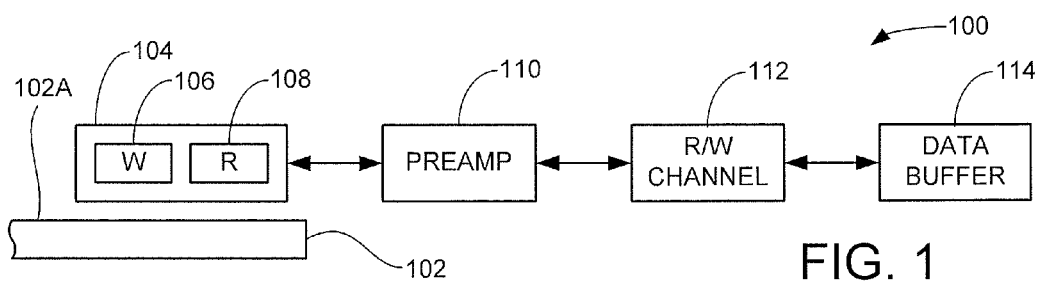
FIG. 1 is a block diagram for a data storage device in accordance with some embodiments.

The present disclosure generally relates to data storage systems, and more particularly to a method and apparatus for optimizing read channel parameters in a storage device.

Data storage devices store and retrieve computerized data in a fast and efficient manner. Such devices often utilize one or more forms of physical memory devices to store the data pending a subsequent data retrieval operation. A read channel is often employed to enable the decoding and reconstruction of the originally stored data.

Read channels may be realized in hardware, software and/or firmware and can apply sophisticated filtering, signal processing, data decoding, error correction and decryption operations as part of a data recovery process. Read channels often employ adaptively determined read channel parameters that are loaded and used as required for different memory locations (e.g., different head/disc combinations, different zones, etc.) and conditions (e.g., data/memory aging, temperature, etc.). Without limitation, examples of adaptive read channel parameters include digital to analog converter (DAC) values, filter tap weights, timing values, threshold levels, etc.

Selecting appropriate read channel parameters can be time and resource intensive. Read channel optimization processing often involves a multi-variable analysis to evaluate different combinations of settings and physical elements. In some cases, a test pattern may be written to the memory and read back while sequentially adjusting different channel parameters to observe channel performance. Channel performance can be assessed in a variety of ways, but usually in the form of an error rate metric, such as but not limited to a bit error rate (BER), channel quality measurement, Viterbi error measurement, least mean squares (LMS) measurement, etc.

While operable, one limitation with conventional channel optimization processing is the fact that many such systems jettison data samples collected during the data analysis process that are outside a normal range (outliers) and base the final determinations on averages or other combinations of the remaining "good" samples. This can tend to mask unstable or highly nonlinear regions of the memory system, and can result in less than optimal solutions.

Accordingly, various embodiments of the present disclosure are generally directed to an apparatus and method for optimizing parameter values for a read channel. As explained below, some embodiments include obtaining raw error rate data for different read channel parameter values in each of a plurality of concentric zones on a rotatable data recording medium. The raw error rate data for each of the different reach channel parameter values are filtered (smoothed) to provide a sequence of second order polynomial curves with smoothed data points in each of the zones.

A second order regression analysis is applied to the smoothed data points in each of the zones to provide a regression curve for each zone. An optimal read channel parameter value is selected for each of the zones using the sequence of regression curves, and the optimal read channel parameter values are thereafter used during subsequent read operations from the zones.

In this way, zone smoothing is applied on a zone (bucket) basis taking all obtained samples into account, not just in-range values as in the prior art. This provides a more robust solution particularly for unstable readers.

These and other features and advantages of various embodiments can be understood beginning with a review of FIG. 1 which shows aspects of an exemplary data storage device 100. The data storage device 100 is characterized as a hard disc drive (HDD) of the type that uses one or more rotatable data recording media 102 and a corresponding array of moveable data read/write transducers 104 to store and retrieve data from a host device. This is merely exemplary and is not necessarily limiting, as the various embodiments can be employed with a number of different types of memory devices including solid state memory.

The transducer 104 in FIG. 1, also referred to herein as a head, includes at least one write (W) element 106 and at least one read (R) element 108. The write element 106 is used to write data to data tracks defined on a data recording surface 102A of the medium (disc) 102. The write element 106 may take the form of a perpendicular recording write element with a coil, main pole and return pole to establish a magnetic recording pattern with magnetic domains perpendicular to the surface 102A. Other write element configurations can be employed including heat assisted magnetic recording (HAMR), microwave assisted magnetic recording (MAMR), two dimensional magnetic recording (2DMR), three dimensional magnetic recording (3DMR), bit patterned media recording, etc.

The read element 108 is used to output one or more readback signals which, when decoded, provide the originally stored data. The read element may take the form of a magneto-resistive (MR) read element or some other suitable sensor configuration. Multiple read elements may be used to support multi-sensor recording (MSR). The transducer 104 can incorporate additional active elements such as electromagnetic radiation sources (e.g., a HAMR laser), proximity sensors, fly-height adjustment mechanisms (e.g., a heater), etc.

FIG. 1 further shows the transducer 104 to be operably coupled to a preamplifier/driver (preamp) circuit 110, a read/write (R/W) channel 112 and a data memory buffer 114. During a write operation, input data to be written to the medium 102 are temporarily stored in the buffer 114. A write channel portion of the R/W channel 112 applies encoding to the data including run length limited (RLL) and error correction coding (ECC), and the preamp 110 supplies time varying bi-directional write currents to the write element 106 to write the encoded data to the medium 102.

During a read operation, a read bias current is applied to the read element 108 to facilitate the generation of a readback signal having pulses corresponding to magnetic flux transitions in the written pattern. The preamp 110 applies initial signal processing such as automatic gain control (AGC) and preamplification, and provides a recovered bit sequence to a read channel portion of the R/W channel 112. The read channel applies signal processing techniques including RLL and ECC decoding to recover the originally stored data. The recovered data are temporarily placed in the buffer 114 pending transfer to the requesting host.

Figure 2:
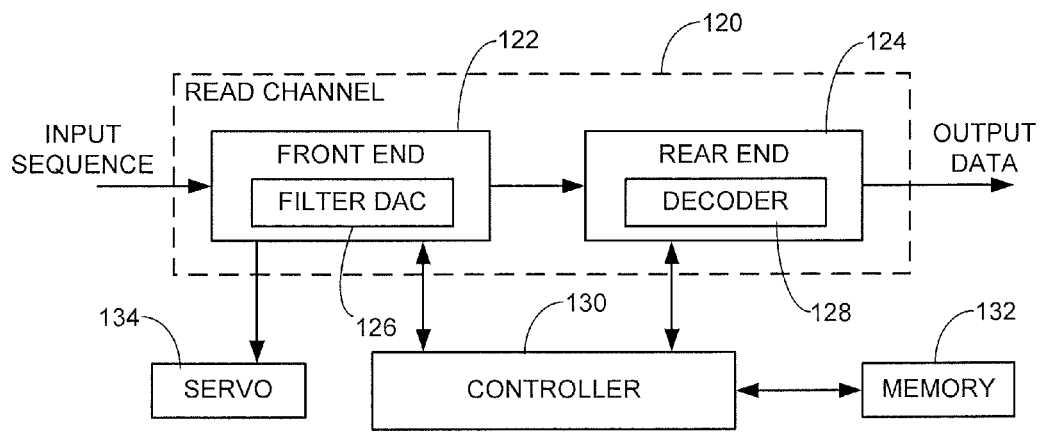
FIG. 2 is a block diagram of a read channel processing portion of the device of FIG. 1.

FIG. 2 illustrates relevant aspects of a read channel 120 from the R/W channel 112 of FIG. 1. The read channel 120 includes a front end processing block 122 and a rear end processing block 124. The respective blocks 122, 124 may be incorporated into a single integrated circuit (IC) package or may be divided among multiple discrete chips. Generally, the front end 122 receives an input sequence during a read operation from the preamp 110 (FIG. 1) and the rear end 124 outputs the originally stored data to the buffer 114.

The front end 122 generally performs initial processing steps such as filtering, analog to digital conversion (ADC), detection operations, bit estimations, etc. To this end, an exemplary continuous time filter ("filter DAC") is represented at 126 as forming a portion of the front end 122. This is merely for purposes of providing an illustrative circuit as any number of different types of circuit elements can be incorporated into the front end 122 depending on the configuration of the channel 120.

The rear end 124 supplies decoding operations to the output from the front end 122 and may include one or more decoders, Viterbi detectors, decision networks, gain stages, etc. For reference, an exemplary decoder is represented at 128. As before, this is merely for purposes of providing an illustrative circuit as any number of different types of circuit elements can be incorporated into the rear end 124 depending on the configuration of the channel.

A controller 130 provides parametric inputs to the read channel 120, including various DAC values that may be used by the filter DAC 126 and tap weights that may be utilized by the decoder 128. These and other values supplied to the read channel are generally referred to herein as "read channel parameters" or "read channel parameter values" and are adaptively selected for different operational and physical combinations (e.g., head/zone/track; temperature; data format; aging; etc.). The controller 130 may be a programmable processor that uses associated memory 132 to store programming instructions as well as the respective parameters for loading and use as required.

A servo circuit 134 is further shown in FIG. 2 in combination with the read channel 120. As will be recognized, the servo circuit 134 forms a closed loop positional control system to advance the data transducer 104 to various tracks defined on the data recording surface 102A using demodulated servo data from the associated disc recording surface.

Figure 3:
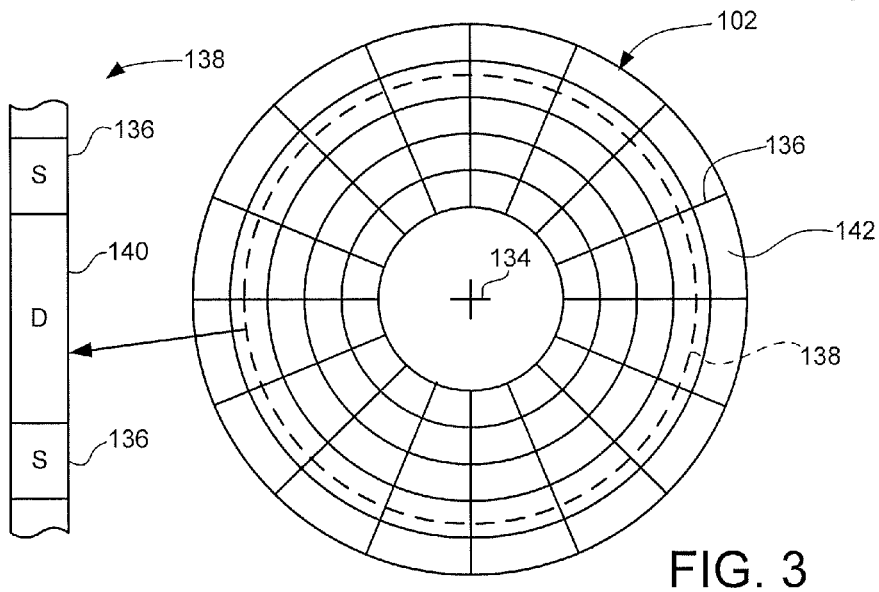
FIG. 3 shows aspects of the rotatable media of FIG. 1.

FIG. 3 shows an arrangement of data on the medium 102 of FIG. 1. A plurality of servo fields 136, or servo wedges, are angularly spaced about the circumference of the medium 102, like spokes on a wheel. The servo fields 136 provide position control information to the servo circuit 134 for closed loop positional control.

A number of concentric tracks are defined on the surface, one of which is denoted by broken line 138. The track 138 includes the aforementioned servo fields 136 as well as data sector regions 140 in between adjacent pairs of the servo fields 136. Fixed sized data sectors (not separately shown) are formed in the data sector regions to store blocks of user data.

Groups of adjacent tracks 138 are arranged into a sequence of concentric zones 142. In a zone-based recording (ZBR) arrangement, each zone is written at a constant write frequency so that each track in each zone stores the same total amount of user data. While a total of five (5) zones 142 are represented in FIG. 3, it will be understood that any number of zones can be arranged on the medium, including zones with different numbers of adjacent tracks.

Figure 4:
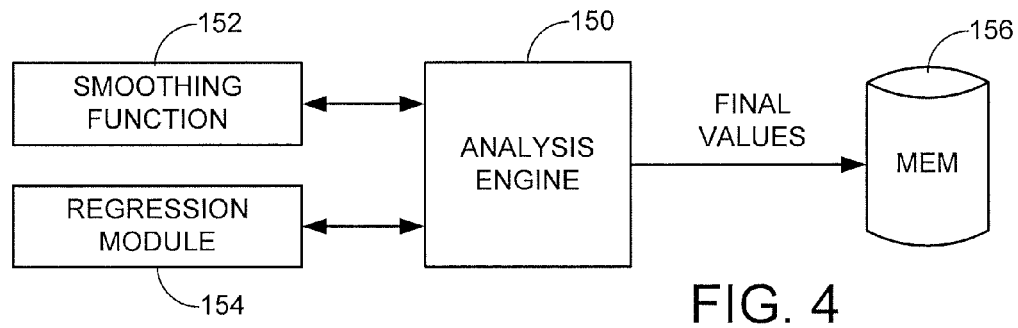
FIG. 4 is a functional block diagram of an analysis engine used in accordance with various embodiments to establish optimal read channel parameter values for the read channel circuitry of FIG. 2.

FIG. 4 is a functional block diagram for an optimization system 150 that operates in accordance with various embodiments of the present disclosure to select optimal read channel parameters for the storage device 100 of FIGS. 1-3. The analysis engine 150 can be realized in hardware, software and/or firmware. In some embodiments, the analysis engine 150 is incorporated into the functionality of the data storage device controller 130 (FIG. 2). In other embodiments, the analysis engine 150 forms a portion of a host device, such as a personal computer or workstation, having one or more processors and corresponding programming in memory to interface with the storage device under test to select and transfer optimal parameter values.

The analysis engine 150 utilizes various modules including a smoothing function module 152 and a regression module 154. Once selected, the final channel parameter values are stored in a suitable memory 156 pending subsequent use by the storage device 100. In some cases, the memory 156 may be non-volatile disc memory (see 102, FIG. 1) and the parameters are transferred to a local volatile memory (see 132, FIG. 2) during device initialization.

Figure 5:
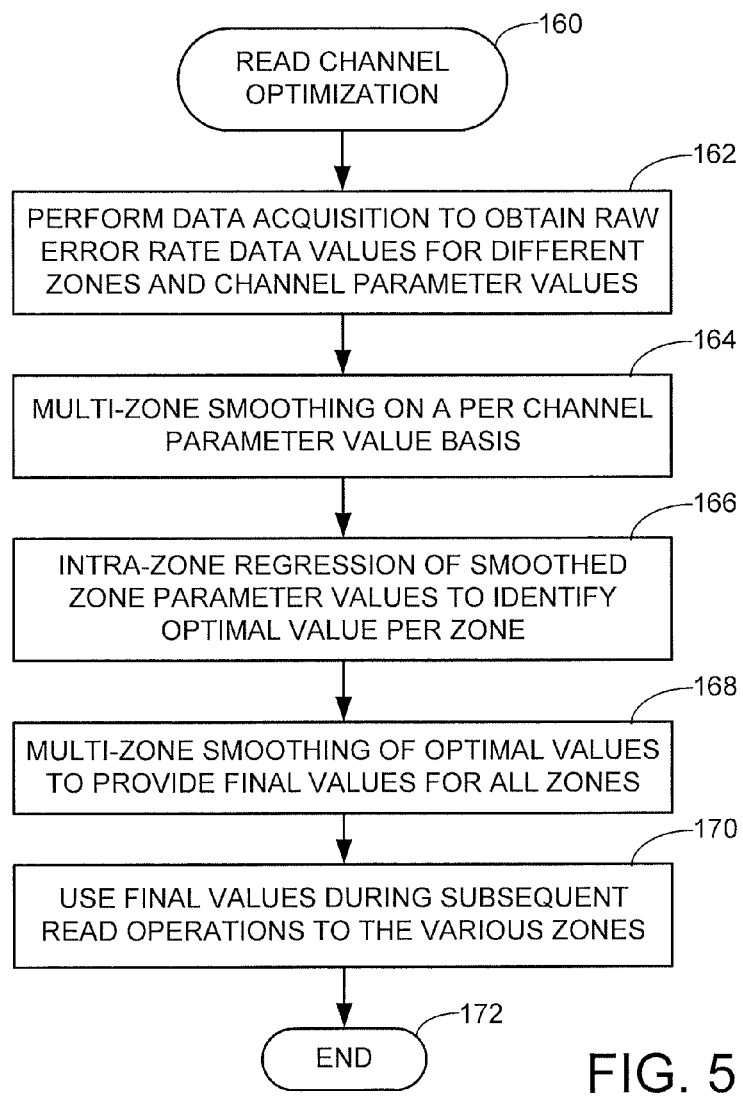
FIG. 5 is a flow chart for a read channel optimization routine carried out by the analysis engine of FIG. 4.

FIG. 5 is a flow chart for a read channel optimization routine 160 carried out by the analysis engine 150 of FIG. 4 in accordance with some embodiments. The various steps set forth in FIG. 5 will be explained in greater detail below.

At this point it will be understood that the routine 160 commences with a data acquisition phase at step 162 during which raw error rate data for different zones and channel parameter values. Once the raw data have been acquired, the process continues at step 164 with the application of a multi-zone smoothing function to the raw data on a per channel parameter value basis. An intra-zone regression analysis of the smoothed zone parameters is performed at 166. Final values are selected for all zones at step 168. The final values are thereafter used during read operations at step 170, and the process ends at 172.

To provide a concrete example, it will be contemplated that the read channel parameter being optimized is a DAC value used by a selected element of the read channel 120, such as the filter DAC 126 (see FIG. 2). This is merely for purposes of illustration and is not limiting, as other channel parameters can be evaluated. In some cases, multiple channel parameters can be concurrently evaluated to select the best combinations of parameters for use by the read channel.

The error rate that is measured and captured during the data acquisition phase (step 162 in FIG. 5) will be contemplated as comprising a bit error rate (BER). As will be appreciated, BER is sometimes expressed in terms of errors per total bits read, and typical BER values may be in the range of, for example, from about $10^{-2}$ to $10^{-3}$. Other BER ranges may be observed, and other types of error rate values such as channel quality rates, decision error rates, etc. can be used as desired.

The data acquisition in accordance with the current example is carried out on a zone basis. With reference again to FIG. 3, a number of zones are identified for testing on each data recording surface. In some cases, every zone is analyzed. In other cases, a subset of the zones are selected (masked) for analysis, and suitable values are interpolated or extrapolated for the non-selected (unmasked) zones. For storage devices having multiple media/head combinations (e.g., two discs/four transducers, etc.), the processing is repeated for each media/head combination in turn.

Write data in the form of a special test pattern is written to one or more tracks in each of the selected zones. The write data may take the form of a repeating pattern such as a 2T pattern. In other cases the data may be specially configured test data with error codes or other encoding to enable assessment of BER. The test pattern is written to the data sector regions 140 (see FIG. 2) and then read over one or more revolutions of the medium 102. A sufficient volume of data is read to enable the calculation of an accurate BER.

Figures 6, 7:
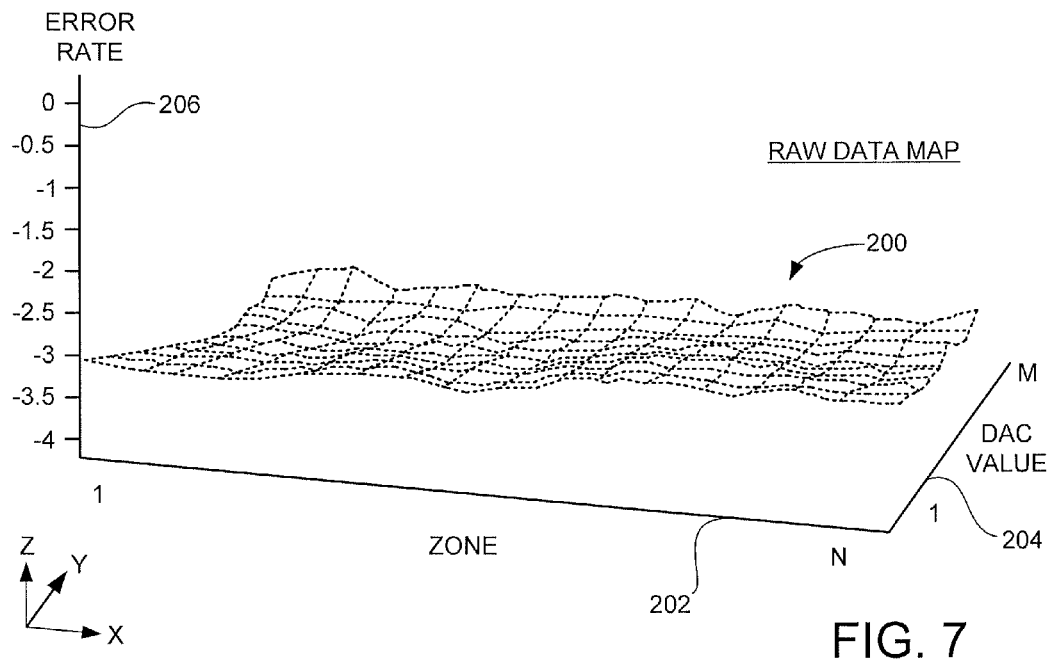
FIG. 6 is a raw data table to show an illustrative format for raw data acquired by the routine of FIG. 5.
FIG. 7 is a graphical representation of a multi-dimensional raw data map structure corresponding to the data from the table in FIG. 6.

FIG. 6 shows a table 180 in memory representing the accumulated (raw) data from the data acquisition step (162, FIG. 5). Other data structures and formats can be used. BER values are obtained for each zone 1 to N using different DAC values from 1 to M where M and N are plural numbers. The M DAC values may constitute all of the available DAC input values (e.g., from 1 to 24, etc.) or may be selected values over the associated range (e.g., 4, 8, 12, 16, 20 and 24). The value BER_1_1 represents the bit error rate for Zone 1/DAC 1, and so on.

FIG. 7 shows a raw data map 200 plotted against three orthogonal axes: a zone x-axis 202, a DAC value y-axis 204 and an error rate z-axis 206. The raw data map 200 provides a three-dimensional (3D) surface of the raw data values from the table 180 in FIG. 6. It is not necessarily required that a surface such as the map 200 be generated during the routine 160 of FIG. 5, but the display of such will be helpful during the explanation of the steps carried out by the routine.

Figure 8:
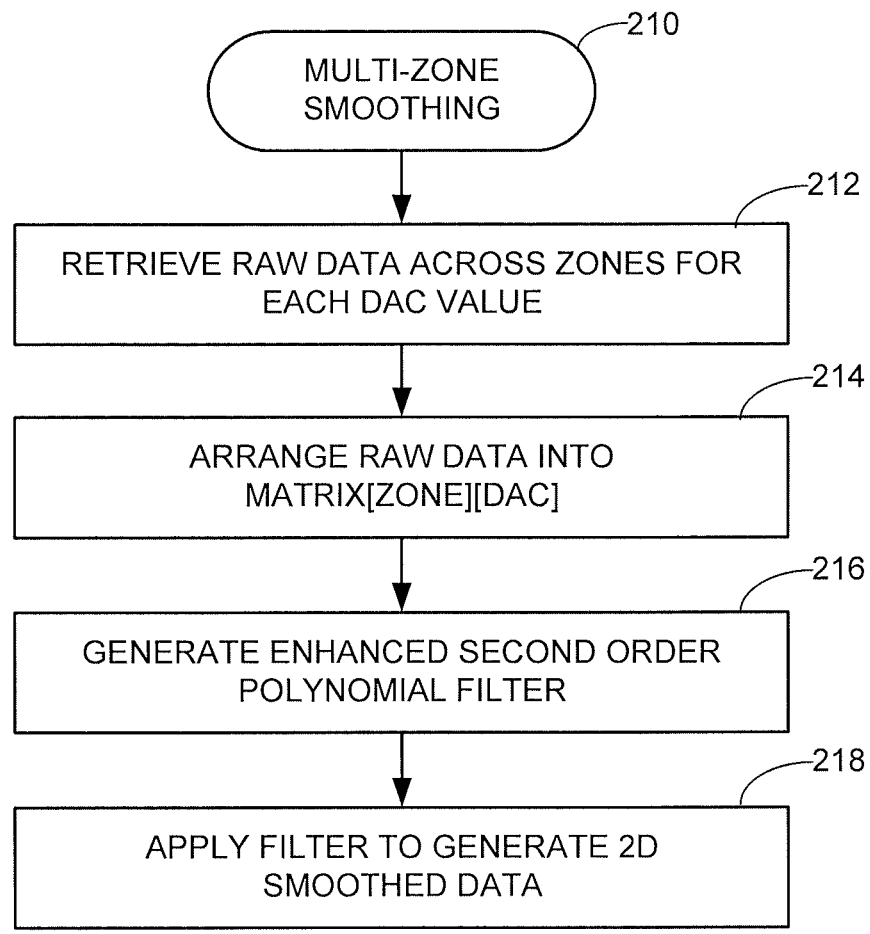
FIG. 8 is a flow chart for a multi-zone smoothing routine carried out in accordance with the flow of FIG. 5.

The data are smoothed in accordance with a multi-zone smoothing routine 210 as set forth in FIG. 8. The routine 210 corresponds to step 164 in FIG. 5 and generally operates to fit the data for each DAC setting to a second order polynomial curve. The routine 210 includes steps of retrieving the raw data across the N zones for each DAC value (step 212). The raw data are arranged into a matrix form at step 214. An enhanced second order polynomial filter is generated at step 216, and the filter is applied to smooth the data at step 218.

Figure 9:
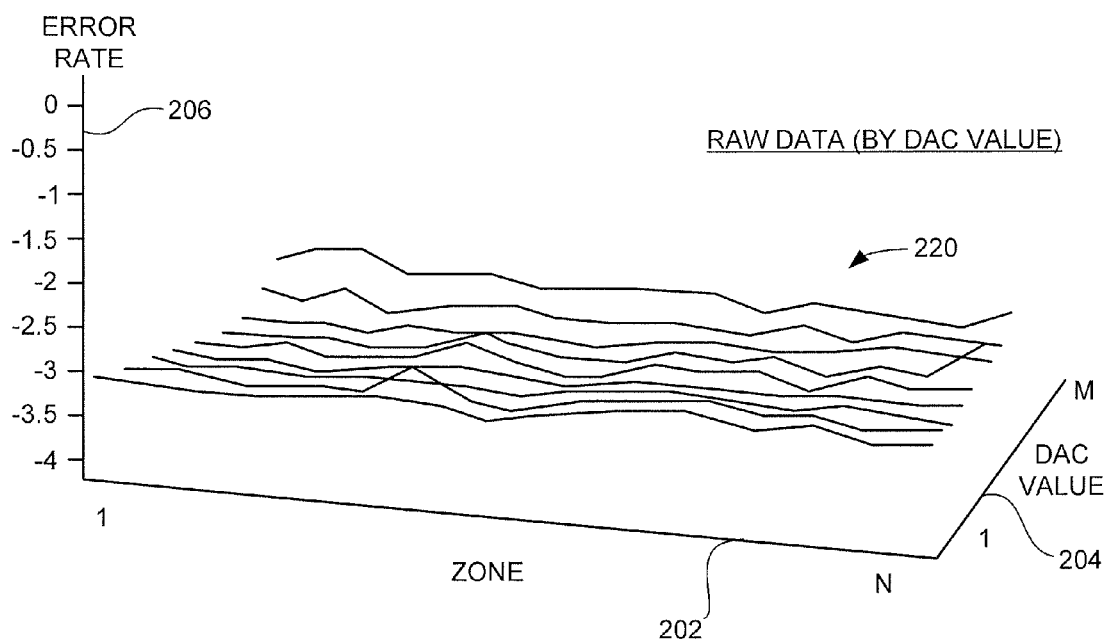
FIG. 9 is a graphical representation of the raw data from FIG. 7 expressed as segmented lines for different digital to analog converter (DAC) values.

The raw BER values are graphically represented in FIG. 9 by curve set 220, plotted against the x, y, z axes 202, 204 and 206 shown above in FIG. 7. Each of the individual curves (lines) represents the respective raw BER values for a different one of the DAC values, which corresponds to a different column in the table 180 in FIG. 6. The processing of the routine 210 in FIG. 8 results in a second set of smoothed BER values represented in FIG. 10 by curve set 230.

Figure 10:
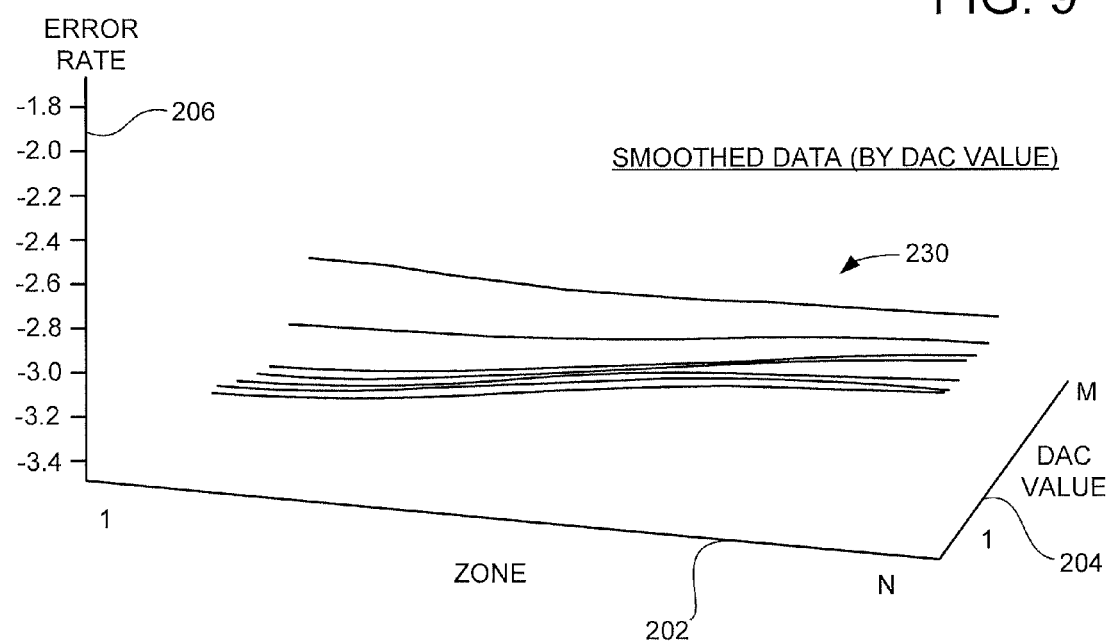
FIG. 10 is a graphical representation of smoothed data obtained from the application of the routine of FIG. 8 to the raw data in FIG. 9.

The smoothed data in FIG. 10 are obtained by applying an enhanced filter matrix to a raw data matrix and applying cross multiplication, as follows:

$$D_S = M_{Ef} \times D_R \quad (1)$$

where $D_S$ represents a two dimensional (2D) matrix of the smoothed data, $M_{Ef}$ is the enhanced filter matrix and $D_R$ represents a 2D matrix of the raw data. The matrices $D_S$ and $D_R$ have a dimension of [N, M] where N is the total number of zones and M is the total number of DAC values that were analyzed. The $M_{Ef}$ matrix is a square matrix of size [N, N] and is an enhanced filter obtained from a basic filter matrix $M_f$.

In some embodiments, the $M_{Ef}$ matrix is a diagonal liked matrix which is superimposed with a submatrix $M_S$. The submatrix $M_S$ is a five-tap finite impulse response (FIR) filter based on a second order polynomial smoothing function, such as the well-known Savitzky-Golay filter, as follows:

$$M_S = [-3\ 12\ 17\ 12\ -3]/35 \quad (2)$$

In the $M_{Ef}$ filter matrix, each element on the diagonal is aligned with the main tap of the submatrix $M_S$. The basic filter matrix can be described as follows:

$$M_f = \begin{bmatrix} \sum_{i\leq 3} M_S[i] & M_S[4] & M_S[5] & 0 & \cdots & 0 & 0 & 0 \\ \sum_{i\leq 2} M_S[i] & M_S[3] & M_S[4] & M_S[5] & \cdots & 0 & 0 & 0 \\ M_S[1] & M_S[2] & M_S[3] & M_S[4] & \cdots & 0 & 0 & 0 \\ 0 & M_S[1] & M_S[2] & M_S[3] & \cdots & 0 & 0 & 0 \\ \vdots & \vdots & \vdots & \vdots & \cdots & \vdots & \vdots & \vdots \\ 0 & & & & \cdots & M_S[3] & M_S[4] & M_S[5] \\ 0 & & & & \cdots & M_S[2] & M_S[3] & \sum_{i\geq 4} M_S[i] \\ 0 & 0 & 0 & 0 & \cdots & M_S[1] & M_S[2] & \sum_{i\geq 3} M_S[i] \end{bmatrix} \quad (3)$$

The basic filter matrix $M_f$ can be used for the smoothing operation of equation (1). However, enhanced smoothing may be achieved by self-multiplying the basic filter matrix $M_f$ a selected number of times, such as 100 times, as shown by equation (4):

$$M_{Ef} = M_f^{100} \quad (4)$$

Accordingly, the smoothed data $M_S$ can be obtained using equations (1), (3) and (4). Other smoothing filter approaches can be used as desired. While not necessarily required, it will be noted that the foregoing approach takes each of the raw data points (FIG. 9) into account in generating the associated smooth data lines (FIG. 10). As before, the graphs of FIGS. 9 and 10 need not necessarily be generated and/or displayed, but are provided to help explain the foregoing processing.

Figure 11:
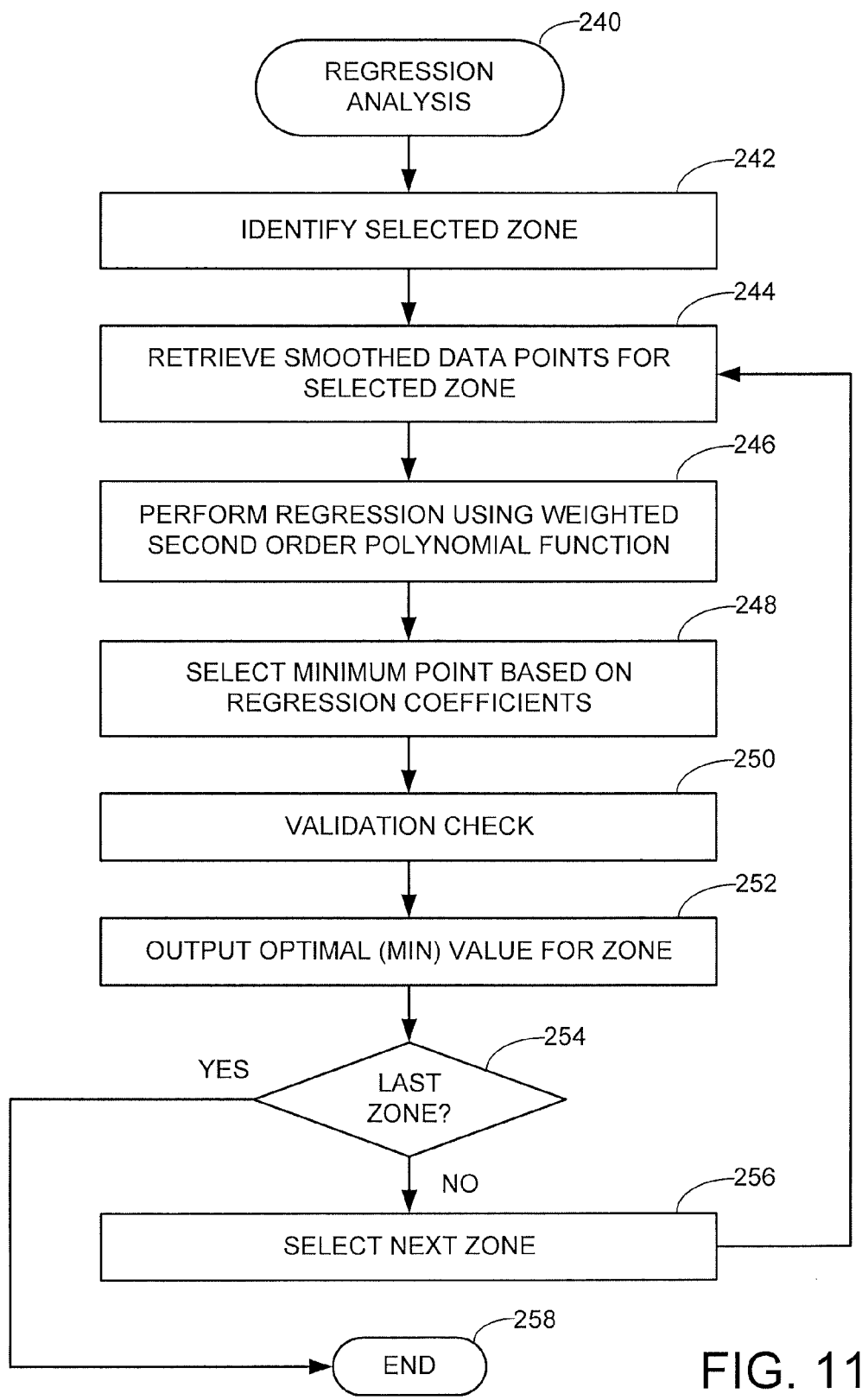
FIG. 11 is a flow chart for a regression analysis routine carried out upon the smoothed data from FIG. 10 in accordance with the routine of FIG. 5.

FIG. 11 shows a regression routine 240 that is next carried out on the smoothed data $M_S$ obtained from the routine of FIG. 8. Generally, the regression analysis operates upon the smoothed DAC value data in each zone (bucket). As before, the regression analysis operates using a second order function.

The routine 240 begins by selecting a first zone for analysis at step 242. The smoothed data points (values) for the selected zone are retrieved at step 244, and a regression analysis is performed on the retrieved data points using a weighted second order polynomial function at step 246, which will be discussed below.

A minimum point in the regression output is selected at step 248, and after a validation check 250 to ensure the minimum point is within the applicable range, the optimal (minimum) value is identified and stored for the selected zone.

Decision step 252 determines whether additional zones are to be evaluated; if so, the next zone is selected at step 254 and the foregoing process is repeated. Once all of the zones have been evaluated, the process ends at step 256. It will be appreciated that at the conclusion of the routine 240 of FIG. 11, an optimal DAC setting value will have been identified for each masked (evaluated) zone, and the optimal DAC value may be different for each zone.

The regression process can be characterized as a bucket (zone) curve based process. For each measured zone, bucket data are extracted from the previously smoothed matrix $M_S$. The regression function used is a weighted second order polynomial with independent variables corresponding to the DAC values and dependent variables are the smoothed data at the corresponding DAC point. A suitable weight function is as follows:

$$w(DAC) = \exp\left(-\frac{(DAC - \overline{DAC})^2}{2\sigma^2}\right) \quad (5)$$

where $\overline{DAC}$ is the median of the three DAC values with the minimum (best) dependent variable data, and a is a suitable value such as $\sigma=1.4$. The weighted polynomial regression can be expressed as follows and has a strict analytical result for each coefficient:

$$BER(DAC) = aDAC2 + bDAC + C \quad (6)$$

The validation step 250 operates to ensure that the minimum (min) DAC point, which is the asymmetry point of the quadratic equation, is valid. The min point will be adjudged as being invalid if the min point is outside the existing DAC range, or if the open direction of the resulting curve is facing down, that is, the coefficient a in equation (6) is less than zero (a<0). If the min point is found to be invalid, an error handling process will be used to select a new min point. A variety of error handling processes can be used.

In one case, if the min DAC value is one of the end points from the measurement mask, the DAC value is used. Otherwise, a regular quadratic regression can be performed based on the minimum DAC value and its two neighbors and corresponding measurement data.

Figure 12:
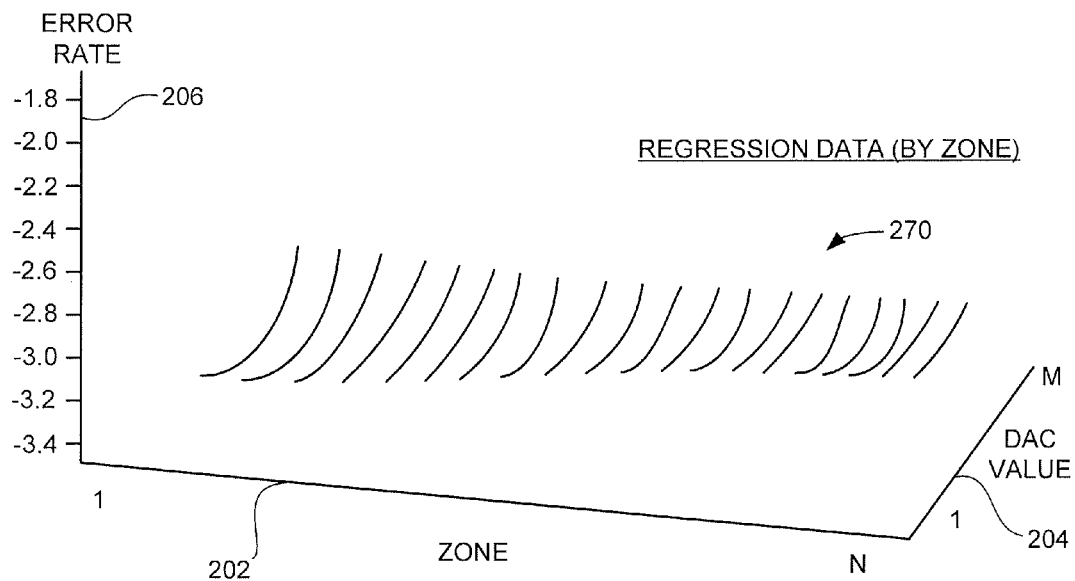
FIG. 12 is a graphical representation of regression data by zone obtained by the routine of FIG. 11.

Accordingly, the flow of FIG. 11 results in the selection of optimal DAC values for each of the analyzed zones, and these optimal DAC values can be stored in memory for subsequent use (e.g., memory 158, FIG. 4). FIG. 12 shows a regression curve set 260 representative of a number of regression results for the smoothed data in each zone. As discussed above, the minimum valid data point on each curve is selected as the optimal value. As before, the curves need not necessarily be generated and/or displayed but are provided for purposes of reference.

Figure 13:
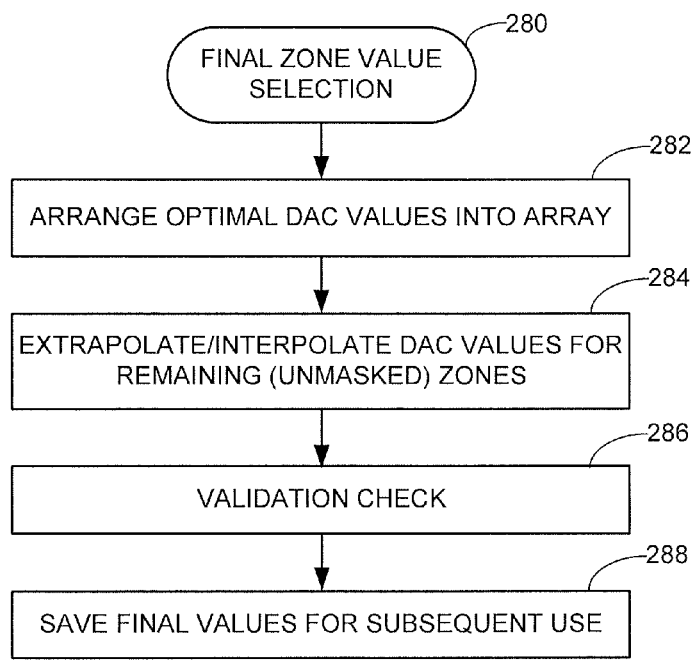
FIG. 13 is a flow chart for a final zone value selection routine carried out upon the final values from FIG. 11 in accordance with the routine of FIG. 5.

An optional DAC zone smoothing operation can next be performed as shown by a final zone selection value routine 280 in FIG. 13. The routine 280 can be used to select appropriate DAC values for other zones that were not analyzed during the foregoing discussion. Similar smoothing is applied to the optimal DAC values as in FIGS. 8 and 10. Values for zones interspersed between the analyzed zones are interpolated and values for zones that extend beyond the analyzed zones are extrapolated.

As shown by FIG. 13, the optimal DAC values obtained from the routine of FIG. 11 are arranged into a 2D array at step 282. DAC values for the remaining (unmasked) zones are derived at step 284 using the same filter matrix approach of FIG. 8. A validation check is performed at step 286, and the final values for the unmasked zones are stored at step 288.

In one embodiment, a min DAC array $M_{MIN}$ is multiplied by the filter matrix $M_f$ to generate a final DAC array $M_{FINAL}$ as follows:

$$M_{FINAL} = M_{MIN} \times M_f \qquad (7)$$

This multiplication may be repeated a selected number of times, such as up to five times, until the total number of iterations is reached or the following relation is satisfied for all zones:

$$|[DAC_{MIN}*n)] - [DAC_{MIN}(n+1)]| < 1 \qquad (8)$$

A validation processing and error handling process is applied as discussed above for out of range or otherwise invalid DAC points.

It will now be appreciated that the various embodiments discussed above provide a fast and accurate methodology for read channel parameter optimization. A smaller data set size can be analyzed as compared to existing processes, leading to faster processing. Moreover, all data points are used in the smoothing and regression analyses, which can result in a more robust system particularly for unstable readers (e.g., readers that exhibit nonlinearities or other abnormal characteristics).

While the foregoing embodiments have been directed to the use of DAC values as the parameters under evaluation and BER as the error rate metric, these are presented merely for purposes of providing a concrete example. Any number of parameters and metrics can be used. Moreover, the foregoing embodiments are not necessarily limited to rotatable media; the technique can be applied to other environments including solid state memory arrays, such as but not limited to flash memory.

The generation of curves as discussed herein will be understood to correspond to the generation of data points that follow or otherwise describe such curves, and does not necessarily require the separate plotting and/or display of such curves.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present disclosure.

What is claimed is:

1. A method comprising:
obtaining raw error rate data for different read channel parameter values in each of a plurality of zones of a memory;
filtering the raw error rate data for each of the different read channel parameter values to provide a sequence of second order polynomial curves with smoothed data points in each of the zones;
applying a second order regression to the smoothed data points in each of the zones to provide a sequence of regression curves;
selecting an optimal read channel parameter value for each of the zones using the sequence of regression curves; and
using the optimal read channel parameter values during subsequent read operations to retrieve data stored in the zones.

2. The method of claim 1, further comprising writing a test pattern to each of the zones and reading the test patterns back from the zones to generate the raw error rate data.

3. The method of claim 1, wherein the raw error rate data comprises a bit error rate for each zone.

4. The method of claim 1, wherein the raw error rate data are filtered using a filter matrix.

5. The method of claim 4, wherein the filter matrix is generated by self multiplying a base filter matrix by itself a selected number of times to generate an enhanced filter matrix, and combining the enhanced filter matrix with a data matrix of the raw error rate data.

6. The method of claim 1, wherein the raw error rate data are filtered using a Savitzky-Golay filter.

7. The method of claim 1, wherein the second order regression is a weighted second order regression upon all of the smoothed data for each selected zone, and a minimum data point in the regression is selected as the optimal read channel parameter value.

8. The method of claim 1, wherein the plurality of zones comprise a subset of a total number of zones in the memory, and the method further comprises using a filter to select optimal read channel parameter values remaining zones in said total number of zones not in the subset.

9. The method of claim 1, wherein the read channel parameter values each comprise a digital to analog converter (DAC) input value.

10. The method of claim 1, wherein the zones comprise concentric groups of tracks on a rotatable data recording medium.

11. The method of claim 1, wherein the raw error rate data are generated by a data storage device and transferred to a host computer coupled to the data storage device, the host computer comprising a processor having associated memory which when executed performs the filtering, applying and selecting steps, and further when executed transfers the optimal read channel parameter values to a memory of the data storage device for subsequent use by the data storage device.

12. An apparatus comprising:
a memory comprising a plurality of zones;
a read channel circuit adapted to reconstruct data stored in the memory; and
an analysis engine circuit which selects an optimal read channel parameter for use by the read channel during read operations with each of the respective zones, the analysis engine configured to filter raw error rate data for each of a plurality of settings of the read channel parameter to provide a sequence of second order polynomial curves with smoothed data points in each of the zones, to apply a second order regression to the smoothed data points in each of the zones to provide a sequence of regression curves, and to select the optimal read channel parameter for each of the zones using a minimum point in each of the sequence of regression curves.

13. The apparatus of claim 12, wherein the memory and the read channel circuit are disposed within a data storage device, and the analysis engine circuit is disposed within a host computer operably coupled to the data storage device.

14. The apparatus of claim 12, further comprising a write channel circuit which writes a test pattern to each of the zones, wherein the read channel circuit subsequently reads the test patterns to generate the raw error rate data.

15. The apparatus of claim 12, wherein the analysis engine circuit filters the raw error rate data by arranging the raw filter rate data into a data matrix and combining the data matrix with a filter matrix.

16. The apparatus of claim 12, wherein the analysis engine circuit applies a weighted second order regression upon all of the smoothed data for each selected zone, and a minimum data point in the regression is selected as the optimal read channel parameter value.

17. The apparatus of claim 16, wherein the analysis engine circuit further validates the minimum data point in the regression by determining the minimum data point is within an operable range for the read channel parameter.

18. The apparatus of claim 12, wherein the read channel parameter is a digital to analog converter (DAC) input value used by the read channel circuit during read operations.

19. The apparatus of claim 12, wherein the plurality of zones comprise a subset of a total number of zones in the memory, and the analysis engine circuit further uses a filter to select optimal read channel circuit parameter values for remaining zones in said total number of zones not in the subset.

20. The apparatus of claim 12, wherein the zones comprise concentric groups of tracks on a rotatable data recording medium.

* * * * *